No. 858,827. PATENTED JULY 2, 1907.
J. RAMSPERGER.
METHOD OF SECURING DOWEL PINS IN ARTIFICIAL TEETH.
APPLICATION FILED NOV. 1, 1905.
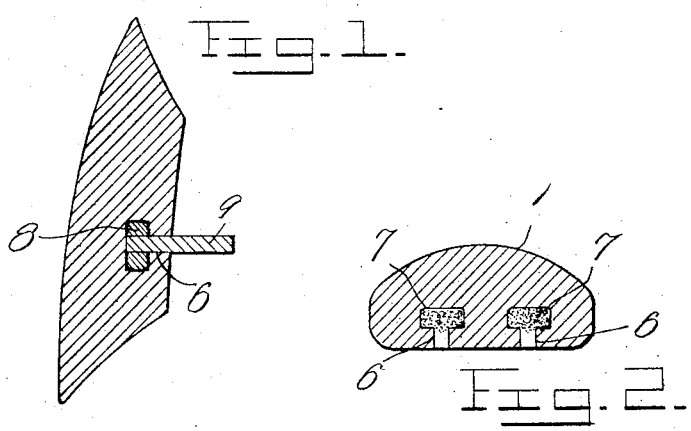
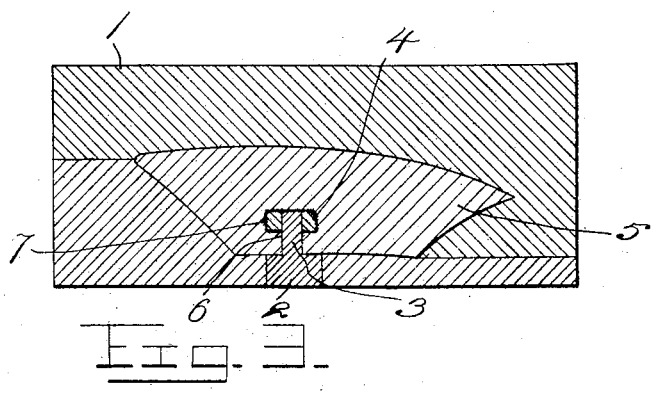
Witnesses
Inventor
Joseph Ramsperger
By Chandler & Chandler
Attorneys

UNITED STATES PATENT OFFICE.

JOSEPH RAMSPERGER, OF YORK, PENNSYLVANIA.

METHOD OF SECURING DOWEL-PINS IN ARTIFICIAL TEETH.

No. 858,827.  Specification of Letters Patent.  Patented July 2, 1907.

Application filed November 1, 1905. Serial No. 285,417.

*To all whom it may concern:*

Be it known that I, JOSEPH RAMSPERGER, a citizen of Switzerland, residing at York, in the county of York, State of Pennsylvania, have invented certain new and useful Improvements in Methods of Securing Dowel-Pins in Artificial Teeth; and I do hereby declare the following to be a full, clear, and exact description of the invention, such as will enable others skilled in the art to which it appertains to make and use the same.

This invention relates to improvements in the method of securing dowel pins in artificial teeth.

It has been found in practice that a dowel pin cannot be made to stay in an ordinary straight hole for the reason that the friction is not sufficient and if the fit is made sufficiently close to insure against the pin pulling out, then there is danger of cracking the tooth in forcing the pin into place. Various methods have been proposed for securing the pins by soldering them to plates baked into the teeth, but such plates must be of platinum because of the necessity of refractoriness and prevention of discoloration of the teeth. Platinum plates are expensive and in a factory where millions of teeth are manufactured in a year, the aggregate expense is enormous. It has been found that the best method for holding the pins in the teeth is to enlarge the inner ends of the holes or recesses that receive the pins and then provide the pins with heads that fill the enlargements. It is desirable that the heads of the pins be of solder because of the cheapness of the material and of the operation. It is found in practice, however, that a simple inwardly enlarged cavity in a porcelain tooth cannot be filled with solder as a head for a pin for the reason that the solder when melted, instead of flowing into close contact with the wall of the enlargement, clings to the pin and follows along it outwardly of the recess. It has been proposed to line the recess and its enlargement with an inwardly expanded platinum tube, but both the material and the process are expensive. Such a lining has for its object to provide a metal surface to which the solder will cling so that the enlargement may be filled with solder.

The object of the present invention is to provide a method for providing the enlarged recess in the finished article with particles of metal to which the melted solder will flow and cling and by which it will be held within the enlargement of the cavity to completely fill the cavity while uniting with the pin to hold the latter immovable. This is accomplished by embedding in or impregnating the wall of the cavity with metallic particles, preferably platinum, during the process of baking the teeth.

In the drawings, Figure 1 is a longitudinal section through a tooth embodying the said invention. Fig. 2 is a transverse section. Fig. 3 is a longitudinal section through the tooth and the mold in the process of formation of the tooth.

Referring now to the drawings, 1 designates a common form of mold and 2 the cores by which the recesses or cavities are formed in the tooth. Each core is provided with a core pin 3 and upon each core pin is disposed a collar or head 4 of paper or other combustible material and this collar or head is provided with a covering or coating of platinum particles. The porcelain or other material is then placed in the mold and the whole is subjected to the initial baking process, the core pins with their heads or collars resulting in the formation of inwardly enlarged recesses 7 as illustrated in Fig. 2 of the drawings and the reduced or outer end portions of which recesses are indicated at 6. When the porcelain is placed in the mold around the core pins and their heads, the platinum dust upon the heads is embedded in the walls of the enlarged portions of the recesses, and in the final baking process, during which the core collars are burned out, these platinum particles are permanently fixed in position.

When the attaching pins are to be secured in the teeth, a small cylindrical block of solder 8 is dropped into each recess, the dowel pins 9 are then placed in the recesses and the tooth is subjected to heat sufficient to melt the blocks of solder which when melted completely fill the enlargements of the recesses and unite with the metal particles which insure against the solder following out along the pins. The solder at the same time unites with the inner ends of the pins 9, combining the pins, the solder and the platinum dust into one solid mass so that the pins are held against withdrawal.

Having thus fully described my invention, what I claim as new and desire to secure by Letters-Patent is:—

1. A method of fastening pins to artificial teeth consisting of incorporating within a tooth while in a plastic state, a disk of combustible material having about its circumference a coating of minute particles of refractory metal and afterwards baking the tooth, thus consuming the disk and forming a recess within the tooth and leaving the minute particles of refractory metal burned in the wall of said recess and then soldering a pin to said particles, as set forth.

2. A method of fastening pins to artificial teeth consisting in incorporating within a tooth while in a plastic state, a disk of combustible material having about its circumference a coating of minute particles of platinum, and afterward baking the tooth, thus consuming said disk and forming a recess within the tooth, and leaving the minute particles of platinum burned in the wall of said recess, and then soldering a pin to said particles, as set forth.

3. A method of fastening a pin to an artificial tooth consisting of incorporating within a tooth while in a plastic state, a mass of combustible material provided upon its exterior with particles of metal and afterwards baking the tooth, at a temperature sufficient to consume the combustible mass, and thereby fixing the particles of metal in the wall of the recess formed by the combustible mass, and then soldering a pin to said particles.

4. A method of preparing a tooth for the reception of a fastening pin, consisting of incorporating within the tooth while in a plastic state, a mass of combustible material provided upon its exterior with particles of metal and afterwards baking the tooth at a temperature sufficient to consume the combustible mass and thereby fixing the particles of metal in the wall of the recess formed by the combustible mass.

In testimony whereof, I affix my signature, in presence of two witnesses.

JOSEPH RAMSPERGER.

Witnesses:
JOHN W. MINNICH,
A. J. BRENNEMAN.